(12) United States Patent
Liu

(10) Patent No.: US 12,292,619 B2
(45) Date of Patent: May 6, 2025

(54) ZOOM LENS AND ELECTRICAL DEVICE

(71) Applicant: WUHAN CHINA STAR OPTOELECTRONICS TECHNOLOGY CO., LTD., Wuhan (CN)

(72) Inventor: Fancheng Liu, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 306 days.

(21) Appl. No.: 17/972,742

(22) Filed: Oct. 25, 2022

(65) Prior Publication Data

US 2024/0111126 A1  Apr. 4, 2024

(30) Foreign Application Priority Data

Sep. 29, 2022 (CN) .......................... 202211203927.6

(51) Int. Cl.
*G02B 7/10* (2021.01)
*G06F 1/16* (2006.01)

(52) U.S. Cl.
CPC ............. *G02B 7/102* (2013.01); *G06F 1/163* (2013.01)

(58) Field of Classification Search
CPC ............ G02B 7/102; G02B 7/04; G06F 1/163
See application file for complete search history.

(56) References Cited

U.S. PATENT DOCUMENTS

2015/0331221 A1* 11/2015 Koiwai .................... G02B 7/10
359/701

FOREIGN PATENT DOCUMENTS

| CN | 209013121 U | 6/2019 |
|---|---|---|
| CN | 209068440 U | 7/2019 |
| CN | 211528795 U | 9/2020 |
| CN | 212111993 U | 12/2020 |
| CN | 214504027 U | 10/2021 |
| CN | 114035298 A | 2/2022 |
| CN | 217085380 U | 7/2022 |

OTHER PUBLICATIONS

Chinese Office Action issued in corresponding Chinese Patent Application No. 202211203927.6 dated Jan. 16, 2025, pp. 1-9, 19pp.

\* cited by examiner

*Primary Examiner* — James C. Jones
*Assistant Examiner* — James Jones
(74) *Attorney, Agent, or Firm* — The Roy Gross Law Firm, LLC; Roy D. Gross

(57) ABSTRACT

The present application provides a zoom lens and an electrical device, the zoom lens includes: lens piece set including a first optical lens piece; a lens piece bracket including a bracket main body, where in a first optical lens piece is disposed securely on the bracket main body; a lens barrel sleeved around the lens piece bracket, wherein sliding slots are defined in the lens barrel, an included angle between an extension direction of the sliding slots and a plane in which the lens piece set is located is an acute angle or obtuse angle; a focusing ring sleeved around the lens barrel, wherein guide slots are defined in the focusing ring, and an extension direction of the guide slots is perpendicular to the plane in which the lens piece set is located.

13 Claims, 8 Drawing Sheets

ZOOM LENS AND ELECTRICAL DEVICE

CROSS REFERENCE TO RELATED APPLICATIONS

This application claims the benefit of priority of Chinese Patent Application No. 202211203927.6, filed Sep. 29, 2022, the contents of which are all incorporated herein by reference in their entirety.

FIELD OF INVENTION

The present application relates to a field of optical lens technologies, especially to a zoom lens and an electrical device.

BACKGROUND OF INVENTION

With development of optical lens technologies, a product such as a camera, cell phone, security, projector, virtual reality (VR), augmented reality (AR), head up display (HUD) would employ a zoom lens. It mainly perform focusing through a cylindrical cam. A guide pin is connected to a zoom lens piece bracket through a thread. When a lens barrel is stationary, rotating a focusing ring drives a guide pin to move spirally under interaction between a cam slot and a guide slot. Because the guide pin is connected integrally to the zoom lens piece bracket and the zoom lens piece or the lens piece set, zooming function can be implemented. The guide pin has an outer thread, the zoom lens piece bracket has an inner thread engaged with the outer thread on the guide pin. Because a size of the guide pin is small, component processing is difficult and thread precision cannot be guaranteed, which results in low assembling precision and high assembling eccentricity of the lens piece set of the zoom lens.

SUMMARY OF INVENTION

Accordingly, the present application provides a zoom lens and an electrical device that can increase assembling precision of a lens piece set and lower assembling eccentricity of a lens piece.

To solve the above issue, the present application provides technical solutions as follows:

A zoom lens, wherein the zoom lens comprises:
a lens piece set comprising at least one first optical lens piece;
a lens piece bracket comprising a bracket main body, wherein the first optical lens piece is disposed securely on the bracket main body;
a lens barrel sleeved around the lens piece bracket, wherein at least two sliding slots are defined in the lens barrel, and an included angle between an extension direction of the sliding slots and a plane in which the lens piece set is located is an acute angle or an obtuse angle;
a focusing ring sleeved around the lens barrel, wherein at least two guide slots are defined in the focusing ring, an extension direction of the guide slots is perpendicular to the plane in which the lens piece set is located, one of the guide slots is at least partially aligned with one of the sliding slots;
wherein the lens piece bracket further comprises at least two elastic arms and at least two sliders, the at least two elastic arms are disposed securely on and connected to the bracket main body respectively, one of the sliders is disposed securely on one of the elastic arms, each of the sliders extends through one of the sliding slots aligned with the slider and is connected to and slides in one of the guide slots aligned with the slider.

In an optional embodiment of the present application, the elastic arms is a flat-and-straight type elastic arms, each of the elastic arms is connected perpendicularly to an end of the bracket main body away from the first optical lens piece.

In an optional embodiment of the present application, the elastic arms is a curved type elastic arms, each of the elastic arms comprises a first end and a second end disposed securely at and connected to the first end, the first end is connected perpendicularly to an end of the bracket main body away from the first optical lens piece, the sliders is disposed securely at the second end, and the second end is curved relative to the first end.

In an optional embodiment of the present application, curved directions of the second ends of adjacent two of the elastic arms are the same or opposite.

In an optional embodiment of the present application, a plurality of the elastic arms are disposed evenly on the bracket main body.

In an optional embodiment of the present application, the focusing ring is connected spirally to the lens barrel, the extension direction of the sliding slots along the lens barrel is the same as an extension direction of a thread on the focusing ring.

In an optional embodiment of the present application, the sliding slots spirally extend on the lens barrel.

In an optional embodiment of the present application, during focusing, the lens piece bracket rotates with the focusing ring along a direction perpendicular to the plane in which the lens piece set is located, and the sliders slide in the sliding slots and the guide slots.

In an optional embodiment of the present application, the bracket main body are disposed with the lens barrel coaxially, and an outer wall of the bracket main body and an inner wall of the lens barrel are cylindrical surfaces.

In an optional embodiment of the present application, the zoom lens further comprises a base, an optical element, and a circuit board, the lens barrel, the optical element, and the circuit board are disposed securely on the base, the optical element faces the lens piece set, and the circuit board is connected electrically to the optical element.

In an optional embodiment of the present application, the optical element is one of a photosensitive element, a display screen, and an optical waveguide assembly.

In an optional embodiment of the present application, the elastic arms and the lens piece bracket are formed integrally, and the sliders and the elastic arms are formed integrally.

The present application also provides an electrical device, comprising the zoom lens as described above.

The zoom lens provided by the present application comprises a first optical lens piece, a lens piece bracket, a lens barrel, a focusing ring, etc. The first optical lens piece is disposed securely on the bracket main body. The lens barrel is sleeved around the lens piece bracket. The focusing ring is sleeved around the lens barrel. The lens piece bracket includes a bracket main body, at least two elastic arms and at least two sliders. The elastic arms are disposed securely on and connected to the bracket main body, and one of the sliders is disposed securely on one of the elastic arms. Accordingly, at least two sliding slots and at least two guide slots are defined in the lens barrel and the focusing ring respectively. The lens piece bracket, the elastic arms, the sliders, the sliding slots, and the guide slots cooperatively constitute a focusing system. The focusing system uses elastic deformation of the elastic arms. When the lens piece bracket is sleeved in the lens barrel, the sliders can smoothly bounces into the sliding slots and the guide slots. The lens piece bracket, the elastic arms, and the sliders are assembled into one component, which only simplifies structures of the focusing system but also reduce component tolerance, assembly tolerance, position tolerance, and verticality tolerance of different components such that assembling precision of the zoom lens is improved. The elastic arms also increase fit length between the lens barrel and the lens piece bracket such that eccentricity precision of the first optical lens piece is decreased.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may also acquire other figures according to the appended figures without any creative effort.

DETAILED DESCRIPTION OF PREFERRED EMBODIMENTS

Figure 1:
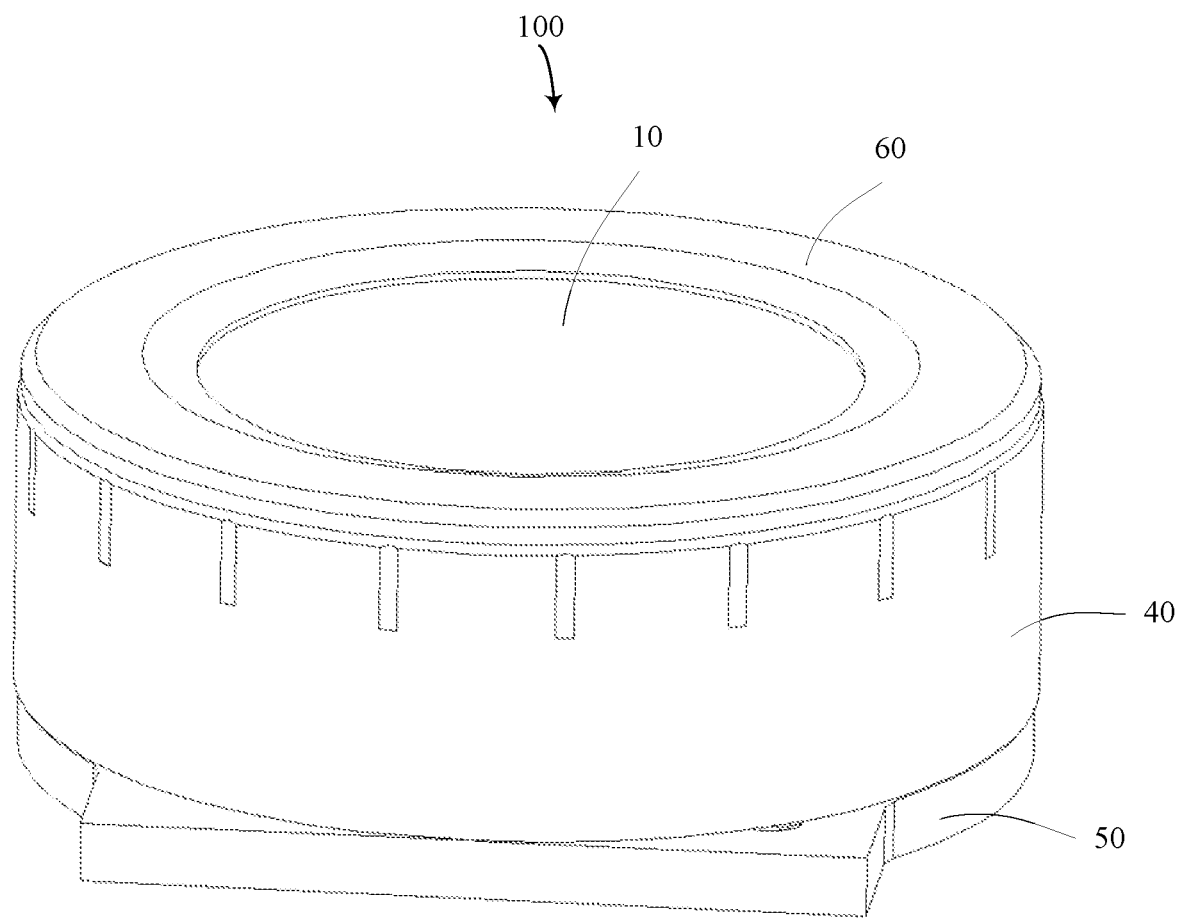
FIG. 1 is a schematic perspective view of a zoom lens provided by a preferred embodiment of the present application.
Figure 2:
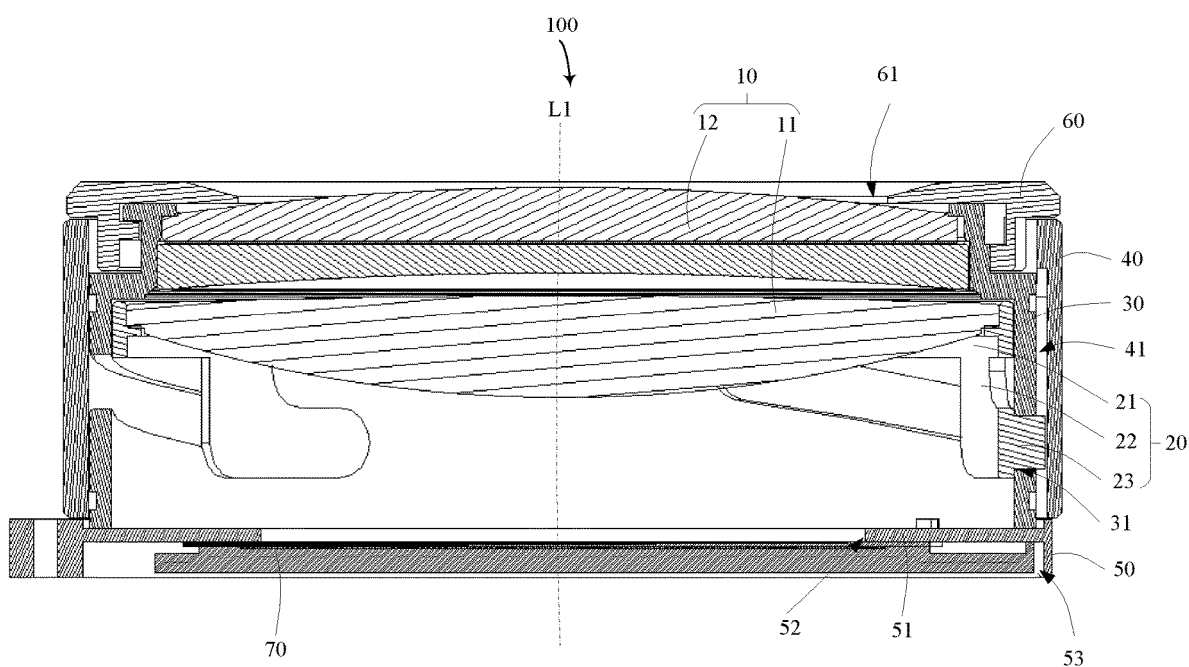
FIG. 2 is a cross-sectional view of the zoom lens shown in FIG. 1.

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

In the description of the present application, it should be understood that terminologies "upper", "lower" for indicating relations of orientation or position are based on orientation or position of the accompanying drawings, are only for the purposes of facilitating description of the present application and simplifying the description instead of indicating or implying that the referred device or element must have a specific orientation or position, must to be structured and operated with the specific orientation or position. Therefore, they should not be understood as limitations to the present application. Furthermore, terminologies "first", "second" are only for the purposes of description, and cannot be understood as indication or implication of comparative importance or a number of technical features. Therefore, a feature limited with "first", "second" can expressly or implicitly include one or more features. In the description of the present application, a meaning of "a plurality of" is two or more, unless there is a clear and specific limitation otherwise.

The present application can repeat reference numbers and/or reference characters, and such repeat has purposes for simplification and clarify and does not indicate relations among various discussed embodiments and/or configurations.

A zoom lens and an electrical device provided by the present application will be described in detail in combination with embodiments and attached drawings.

With reference to FIGS. 1 to 7, the preferred embodiment of the present application provides a zoom lens 100, the zoom lens 100 comprises a lens piece set 10, a lens piece bracket 20, a lens barrel 30, a focusing ring 40, a base 50, a compression ring 60, and an optical element 70. The zoom lens 100 comprises an optical axis L1.

In other embodiment, the zoom lens 100 can also preclude the compression ring 60.

In particular, the lens piece set 10 comprises at least one first optical lens piece 11 and at least one second optical lens piece 12. The first optical lens piece 11 is disposed securely on the lens piece bracket 20. The second optical lens piece 12 is received and disposed securely in the lens barrel 30. The first optical lens piece 11 and the second optical lens piece 12 are arranged in the lens barrel 30 at an interval. The second optical lens piece 12 is located at an end of the lens barrel 30 away from the optical element 70.

The lens piece bracket 20 comprises a bracket main body 21, at least two elastic arms 22, and at least two sliders 23. The bracket main body 21 is accommodated in the lens barrel 30. The first optical lens piece 11 is disposed securely on the bracket main body 21. The at least two elastic arms 22 are disposed securely on and connected to the bracket main body 21 respectively. One of the sliders 23 are disposed securely on one of the elastic arms 22. In particular, the at least two elastic arms 22 are disposed securely on and connected to a surface of the bracket main body 21 away from the first optical lens piece 11.

The bracket main body 21 is hollow and annular, an extension direction of the bracket main body 21 facing an outer wall of the lens barrel 30 is consistent with an extension direction of the lens barrel 30 facing an inner wall of the lens piece bracket 20. Namely, the lens piece bracket 20 and the lens barrel 30 are coaxial. Preferably, an outer wall of the bracket main body 21 and an inner wall of the lens barrel 30 are cylindrical surfaces. The cylindrical surface is easy to process and has high processing precision.

The bracket main body 21 has rigidity.

The elastic arms 22 has elasticity, and the elasticity of the elastic arms 22 is greater than elasticity of the bracket main body 21.

Figure 5:
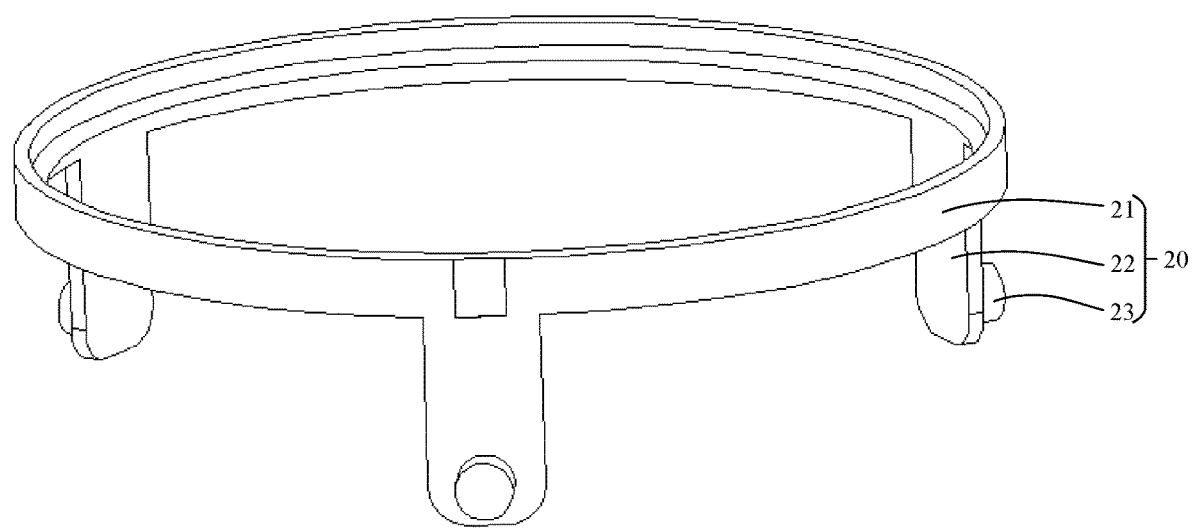
FIG. 5 is a schematic perspective view of a lens piece bracket of the zoom lens shown in FIG. 2.

With reference to FIG. 5, In an optional embodiment of the present application, the elastic arms 22 are flat-and-straight type elastic arms. In particular, each of the elastic arms 22 is connected perpendicularly to an end of the bracket main body 21 away from the first optical lens piece 11.

The flat-and-straight type elastic arms 22 is more suitable for a zoom lens with a larger optical total length margin.

In an optional embodiment of the present application, the bracket main body 21 and the elastic arms 22 are formed integrally.

Figure 6:
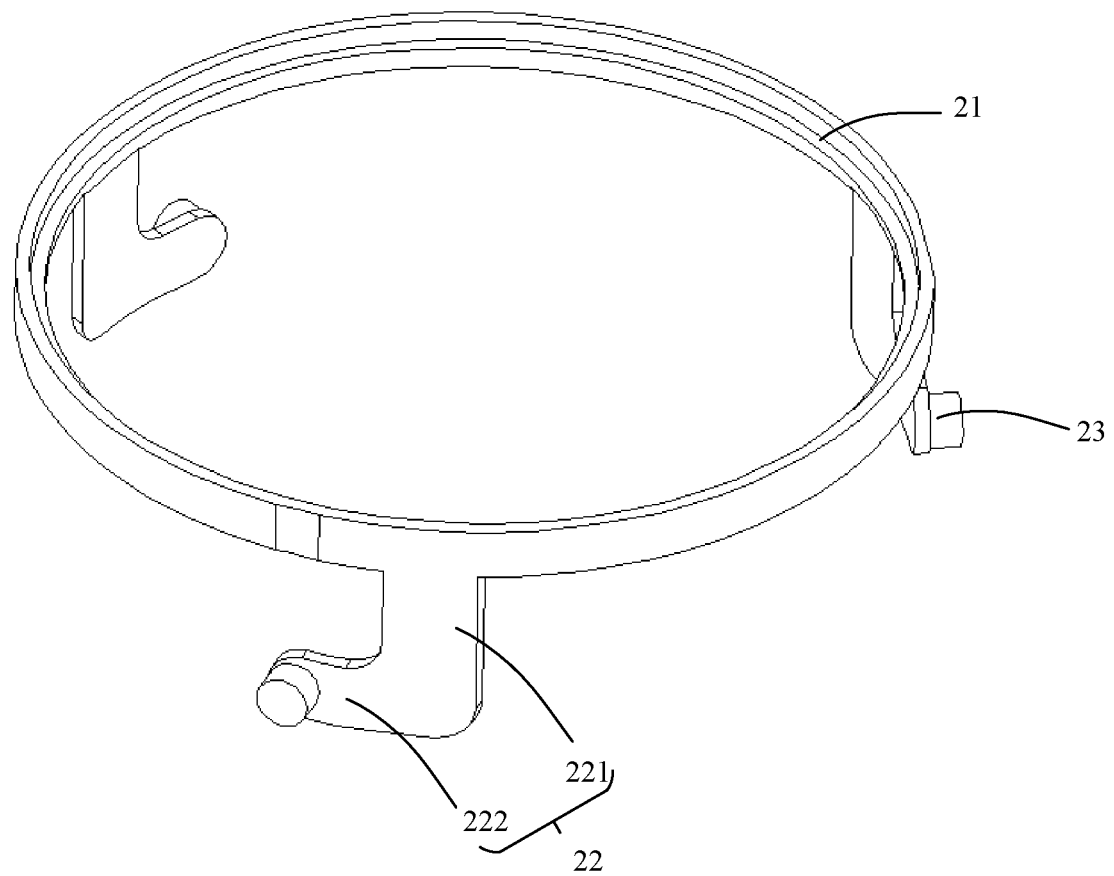
FIG. 6 is a schematic perspective view of another lens piece bracket shown in FIG. 2.

With reference to FIG. 6, In an optional embodiment of the present application, each of the elastic arms 22 are curved elastic arms. In particular, it comprises a first end 221 and a second end 222 connected securely to the first end 221. The first end 221 is connected perpendicularly to an end of the bracket main body 21 away from the first optical lens piece 11. The sliders 23 is disposed securely on the second end 222, and the second end 222 is curved relative to the first end 221.

The curved elastic arms 22 is more suitable for a zoom lens with a smaller optical total length margin.

In the present embodiment, the second end 222 is perpendicular to the first end 221. An extension direction of the second end 222 is consistent with an extension direction of the bracket main body 21.

In an optional embodiment of the present application, curved directions of the second ends 222 of adjacent two of the elastic arms 22 are the same or opposite. Preferably, curved directions of the second ends 222 of adjacent two of the elastic arms 22 are the same. Preferably, lengths of the second ends 222 of adjacent two of the elastic arms 22 are consistent.

In an optional embodiment of the present application, the second end 222 of the elastic arm 22 and the first end 221 of the elastic arm 22 are formed integrally.

In an optional embodiment of the present application, the elastic arms 22 and the sliders 23 are formed integrally.

In the present embodiment, with reference to FIGS. 5 and 6, the sliders 23 are cam pins. Of course, in other embodiment, structures of the sliders 23 are not limited to cam pins and can be other structures.

In the present embodiment, the sliders 23 has rigidity.

Preferably, the at least two elastic arms 22 are arranged evenly on a surface of the bracket main body 21, which can guarantee stable movement of the bracket main body 21 such that the first optical lens piece 11 secured on the bracket main body 21 keeps stable all the way during focusing to prevent bias of the first optical lens piece 11 relative to the optical axis L1. Preferably, a number of the elastic arms 22 is three.

With reference to FIGS. 2 to 4 again, the lens barrel 30 is disposed securely on the base 50. The lens barrel 30 is sleeved around the lens piece bracket 20. Namely, the lens piece bracket 20 is inserted into the lens barrel 30, and the lens piece bracket 20 is accommodated in the lens barrel 30. The lens barrel 30 is hollow and has an inner wall facing the lens piece bracket 20. The inner wall of the lens barrel 30 is a cylindrical surface. The second optical lens piece 12 is disposed securely on the inner wall of the lens barrel 30.

At least two sliding slots 31 are defined in the lens barrel 30. The sliding slots 31 extend through the lens barrel 30, the sliding slots 31 extend from an end of the lens barrel 30 near the optical element 70 to an end of the lens barrel 30 away from the lens barrel 30 (namely, a direction away from the optical element 70). Also, an included angle between an extension direction of the sliding slots 31 and an extension direction of the optical axis L1 (or a plane in which the lens piece set 10 is located) is an acute angle or an obtuse angle. Namely, the extension direction of the sliding slots 31 is not the same as and not perpendicular to the extension direction of the optical axis L1.

In an optional embodiment of the present application, the sliding slots 31 spirally extend along the lens barrel 30. In other embodiment, the sliding slots 31 can be designed according to optical design required for movement demands of zoom lens pieces and is not limited to a spiral shape.

In particular, a size of the sliding slot 31 is equal to or slightly greater than a size of the sliders 23 such that the slider 23 is able to extend through the sliding slots 31.

In particular, a length of the slider 23 is greater than a normal distance between an inner wall and the outer wall of the lens barrel 30 (namely, the wall thickness). Namely, an end of the slider 23 of away from the elastic arms 22 protrudes out from the lens barrel 30.

The focusing ring 40 is sleeved around the lens barrel 30. In an optional embodiment of the present application, an inner wall of the focusing ring 40 facing the lens barrel 30 is a cylindrical surface. At least two guide slots 41 are defined in the focusing ring 40. An extension direction of the guide slots 41 is the same as an extension direction of the optical axis L1. One of the guide slots 41 is at least partially aligned with one of the sliding slots 31. One of the sliders 23 extends through one of the sliding slots 31 aligned with the slider 23 and is connected to and slides in one of the guide slots 41 aligned with the slider 23.

In the present embodiment, the guide slots 41 do not completely extend through the focusing ring 40. Under desirable strength, namely, under a condition of a length of the focusing ring being sufficiently long and other member sealing the guide slots, guide slots can be allowed to extend through the focusing ring. The guide slots 41 are recessed from the inner wall of the focusing ring 40 to an outer wall of the focusing ring 40. The outer wall of the focusing ring 40 is a surface opposite to the inner wall of the focusing ring 40.

In particular, a size of the guide slots 41 matches a size of the sliders 23 such that the focusing ring 40 drives the sliders 23 to slide in the guide slots 41.

In an optional embodiment of the present application, the focusing ring 40 is connected spirally to the lens barrel 30, an extension direction of the sliding slots 31 along the lens barrel 30 is the same as an extension direction of a thread of the focusing ring 40 to lower a risk of the sliders 23 separated out from the guide slots 41.

In other embodiment, connection between the focusing ring 40 and the lens barrel 30 is not limited to spiral connection and can be adjusted according to actual conditions.

The base 50 comprises a support element 51. The lens barrel 30 and the optical element 70 are disposed securely on two opposite surfaces of the support element 51.

In an optional embodiment of the present application, the support element 51 comprises a first aperture 52, and the optical element 70 is at least partially exposed out from the first aperture 52. The base 50 also comprises an accommodation slot 53, and the accommodation slot 53 communicates with the first aperture 52. A size of the accommodation slot 53 is greater than a size of the first aperture 52. The optical element 70 is received in the accommodation slot 53 and is disposed securely on the support element 51.

In other embodiment, according to different lens barrel designs, the bottom portion can also be designed to receive the base of the optical element 70. At this time, the optical element 70 is not necessarily exposed.

The optical element 70 can be a photosensitive element, a display panel, an optical waveguide structure, etc. When the optical element 70 is a photosensitive element, the zoom lens 100 can be applied to an electrical device such as a camera, cell phone, etc. When the zoom lens 100 is a display panel, the zoom lens 100 can be applied to an electrical device such as a virtual reality (VR) apparatus. When the optical element 70 is an optical waveguide structure, the zoom lens 100 can be applied to an electrical device such as an augmented reality apparatus. Of course, the zoom lens 100 can also be applied to an electrical device such as security, projector, head up display, etc., a type of the optical element 70 can be designed according to actual conditions.

The optical element 70 is connected electrically to a circuit board, and the circuit board provides the optical element 70 with electrical signals.

The lens piece bracket 20 can also be connected electrically to a driving element (for example: motor). The driving element is connected electrically to the circuit board, the driving element drives the lens piece bracket 20 to move for implementing auto focusing.

The zoom lens 100 further comprises a compression ring 60, the compression ring 60 is disposed securely on an end of the lens barrel 30 away from the base 50. The compression ring 60 also has a light transmission aperture 61, a part of the lens piece set is exposed out from the light transmission aperture 61. A part of the compression ring 60 protrudes out from the lens barrel 30 and is aligned with an end of the focusing ring 40 away from the base 50 to limit a focusing range of the focusing ring 40.

Figure 3:
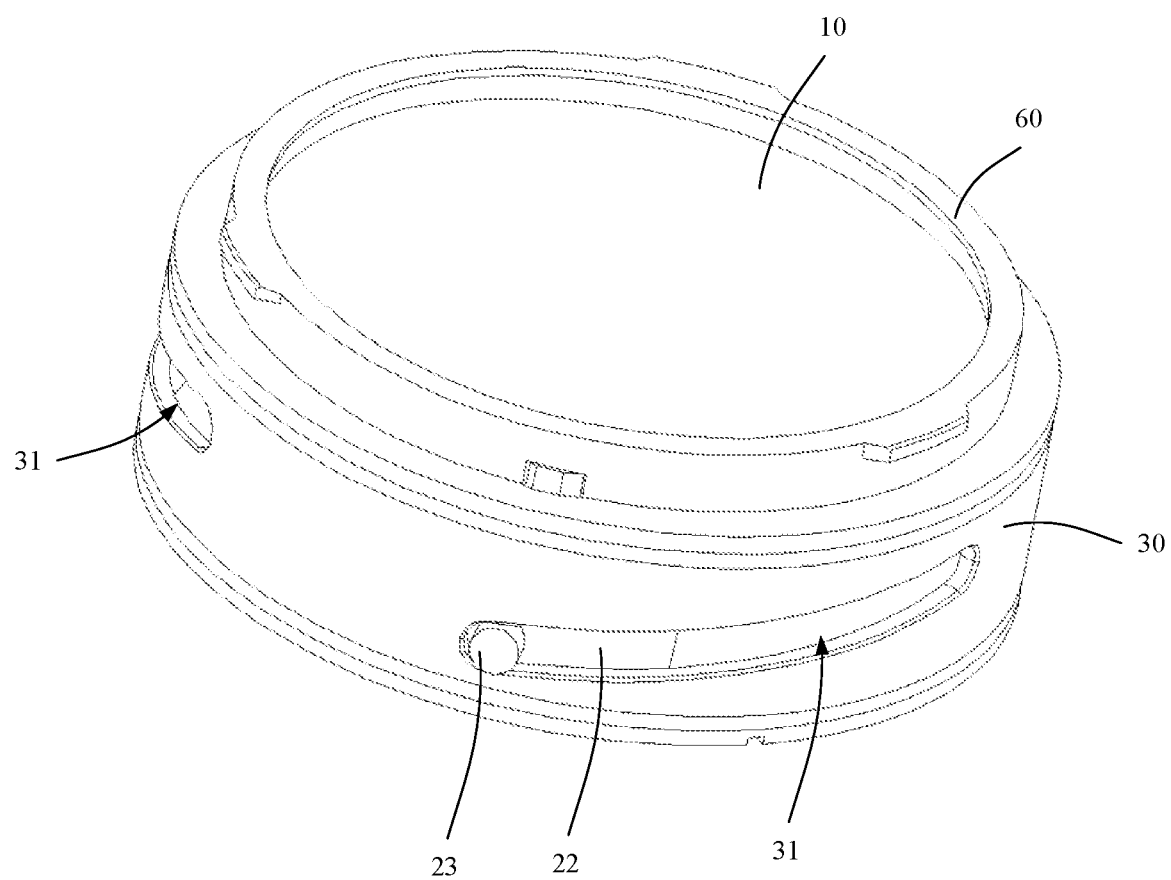
FIG. 3 is a schematic perspective view of the zoom lens shown in FIG. 1 in a first focusing state with removal of a focusing ring.
Figure 4:
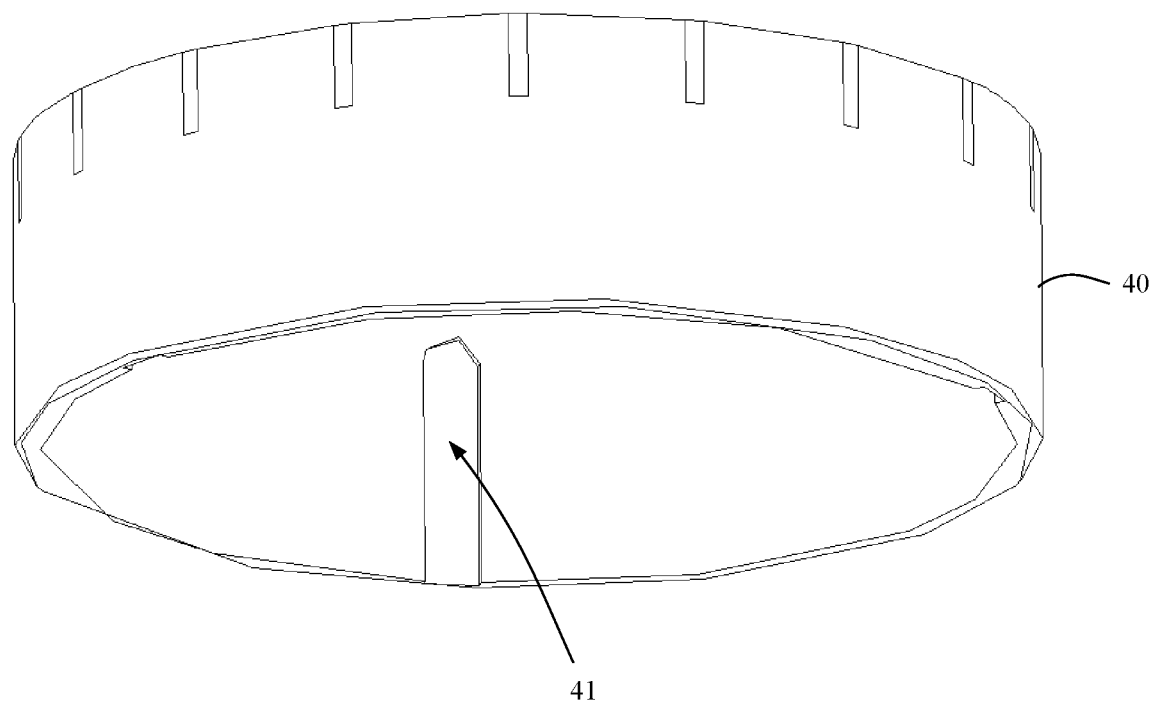
FIG. 4 is a schematic perspective view of the focusing ring shown in FIG. 1.

In particular, with reference to FIG. 3, a distance between the first optical lens piece 11 and the optical element 70 is shortest, the sliders 23 is located at ends of the sliding slots 31 and the guide slots 41 near the base 50.

Figure 7:
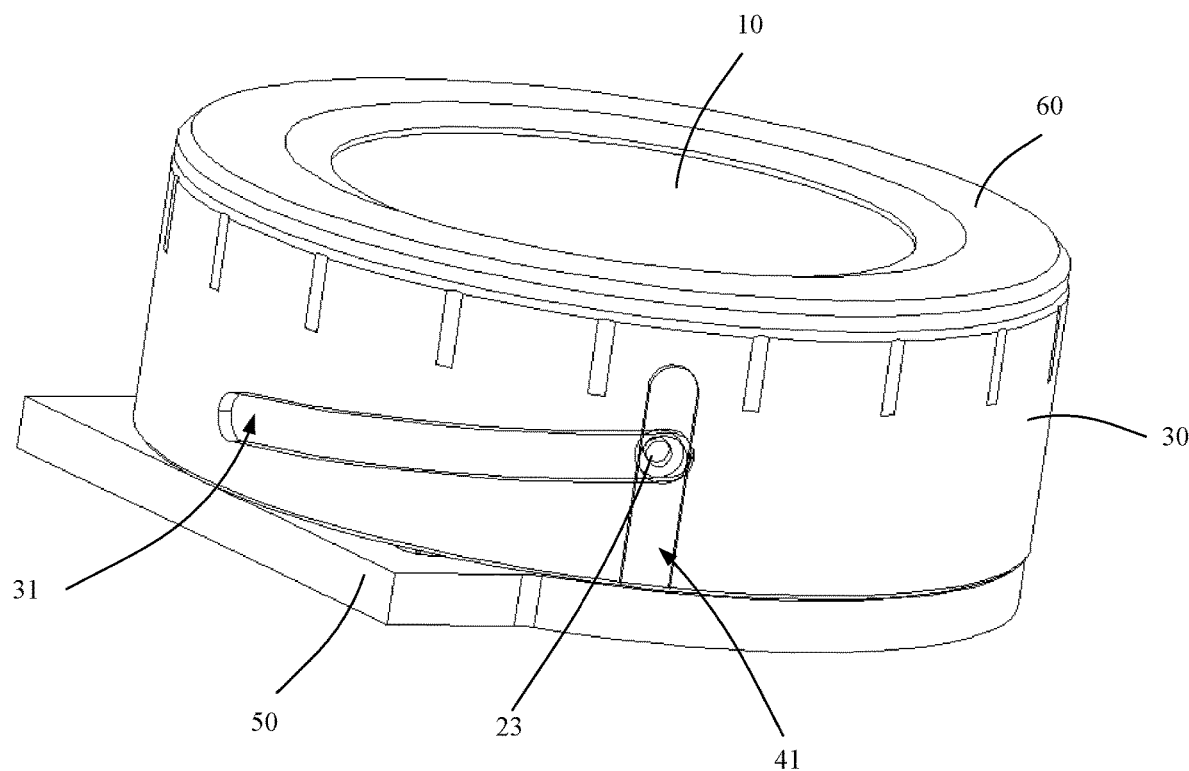
FIG. 7 is a schematic perspective view of the zoom lens shown in FIG. 3 in a second focusing state.

In particular, with reference to FIG. 7, a distance between the first optical lens piece 11 and the optical element 70 is longest, the sliders 23 is located at ends of the sliding slots 31 and the guide slots 41 near the compression ring 60. Alternatively, the sliders 23 is located at ends of the sliding slots 31 and the guide slots 41 away from the optical element 70.

During focusing, the focusing ring 40 is rotated, the focusing ring 40 drives the sliders 23 to slide in the sliding slots 31 and the guide slots 41. The sliders 23 drive the lens piece bracket 20 to perform rotational movement in the lens barrel 30. The lens piece bracket 20 drives the first optical lens piece 11 to move near the optical element 70 or away from the optical element 70 to implement focusing. Namely, the sliders 23 drive the lens piece bracket 20 to perform complex movement of rotation and axial movement.

Figure 8:
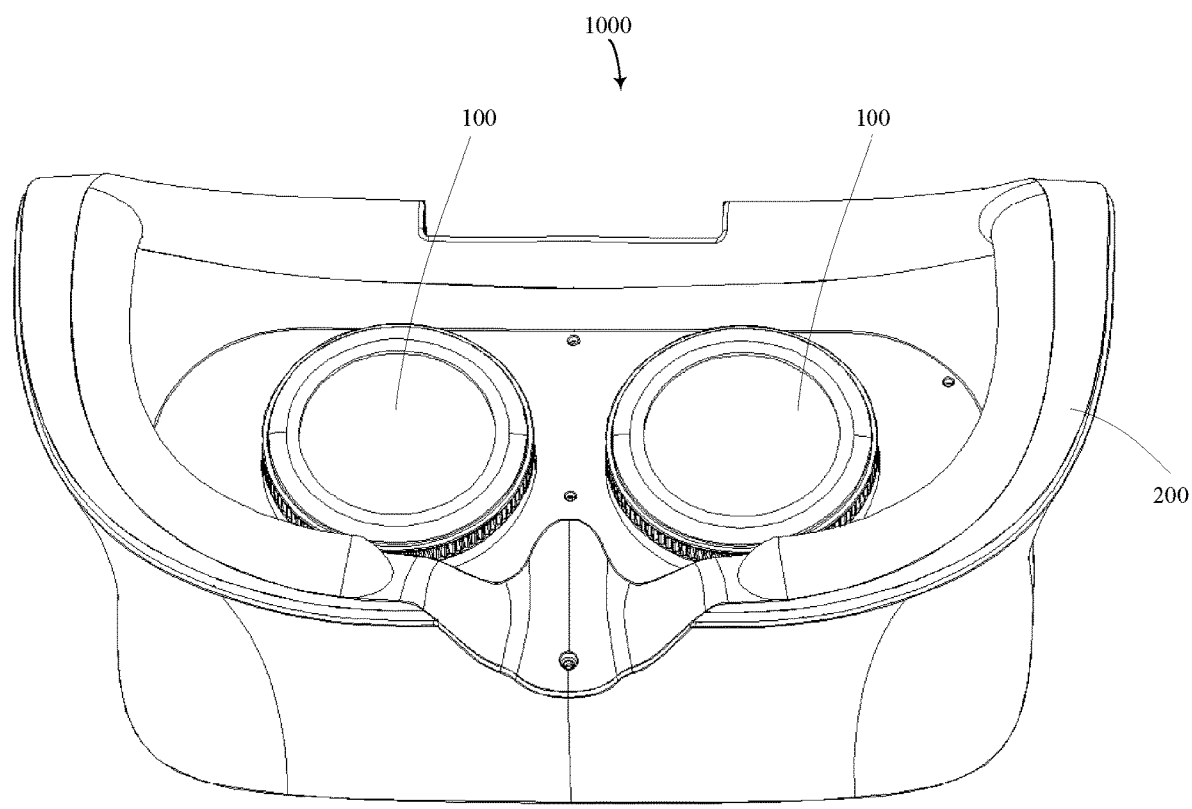
FIG. 8 is a schematic perspective view of an electrical device provided by the present application.

With reference to FIG. 8, the present application also provides an electrical device 1000, the electrical device 1000 comprises a main body 200 and the zoom lens 100. The zoom lens 100 is disposed securely on the main body 200. In the present embodiment, the electrical device 1000 is a virtual reality (VR) display apparatus. In other embodiment, the electrical device 1000 can also be a cell phone, camera, computer, augmented reality (AR) apparatus, projector, head up display (HUD) apparatus, etc.

The zoom lens provided by the present application comprises a first optical lens piece, a lens piece bracket, a lens barrel, a focusing ring, etc. The first optical lens piece is disposed securely on the bracket main body. The lens barrel is sleeved around the lens piece bracket. The focusing ring is sleeved around the lens barrel. The lens piece bracket includes a bracket main body, at least two elastic arms and at least two sliders. The elastic arms are disposed securely on and connected to the bracket main body, and one of the sliders is disposed securely on one of the elastic arms. Accordingly, at least two sliding slots and at least two guide slots are defined in the lens barrel and the focusing ring respectively. The lens piece bracket, the elastic arms, the sliders, the sliding slots, and the guide slots cooperatively constitute a focusing system. The focusing system uses elastic deformation of the elastic arms. When the lens piece bracket is sleeved in the lens barrel, the sliders can smoothly bounces into the sliding slots and the guide slots. The lens piece bracket, the elastic arms, and the sliders are assembled into one component, which only simplifies structures of the focusing system but also reduce component tolerance, assembly tolerance, position tolerance, and verticality tolerance of different components such that assembling precision of the zoom lens is improved. The elastic arms also increase fit length between the lens barrel and the lens piece bracket such that eccentricity precision of the first optical lens piece is decreased.

Furthermore, because a manufacturing process of the elastic arms is comparatively simple, a shape of the elastic arms can be designed according to actual demands, for example: flat-and-straight type or curved type elastic arms, for fitting zoom lenses with different optical total length margins.

Furthermore, assembling the first optical lens piece and the lens piece bracket can also increase rigidity of the focusing system. During focusing, the elastic arms can cushion an external force certainly, which can lower a risk of sway of the first optical lens piece during focusing due to the external force.

Furthermore, elastic arms are used in connection with the bracket main body and the sliders of the lens piece bracket with no need to form a guide pin hole in the bracket main body and no need to increase a thickness of the main body bracket for guaranteeing connection strength and assembly verticality between the guide pin and the zoom lens piece, which can reduce a lens diameter of the zoom lens and advantage miniaturization of the zoom lens.

Moreover, according to analysis of conditions of movement stress, during focusing of the zoom lens of the present application, the elastic arms rotate with the focusing ring, receive extension and compression stresses simultaneously, are not easily deformed such that smoothness of focusing of the focusing system can be improved.

Furthermore, the zoom lens of the present application assembles the lens piece bracket, the lens barrel, and the focusing ring to a focusing system having few components, easy to assemble, and having a low cost.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A zoom lens, comprising:
a lens piece set comprising at least one first optical lens piece;
a lens piece bracket comprising a bracket main body, wherein the first optical lens piece is disposed securely on the bracket main body;
a lens barrel sleeved around the lens piece bracket, wherein at least two sliding slots are defined in the lens barrel, and an included angle between an extension direction of the sliding slots and a plane in which the lens piece set is located is an acute angle or an obtuse angle;
a focusing ring sleeved around the lens barrel, wherein at least two guide slots are defined in the focusing ring, an extension direction of the guide slots is perpendicular to the plane in which the lens piece set is located, one of the guide slots is at least partially aligned with one of the sliding slots;

wherein the lens piece bracket further comprises at least two elastic arms and at least two sliders, the at least two elastic arms are disposed securely on and connected to the bracket main body respectively, one of the sliders is disposed securely on one of the elastic arms, each of the sliders extends through one of the sliding slots aligned with the slider and is connected to and slides in one of the guide slots aligned with the slider.

2. The zoom lens according to claim 1, wherein the elastic arms is a flat-and-straight type elastic arms, each of the elastic arms is connected perpendicularly to an end of the bracket main body away from the first optical lens piece.

3. The zoom lens according to claim 1, wherein the elastic arms is a curved type elastic arms, each of the elastic arms comprises a first end and a second end disposed securely at and connected to the first end, the first end is connected perpendicularly to an end of the bracket main body away from the first optical lens piece, the sliders is disposed securely at the second end, and the second end is curved relative to the first end.

4. The zoom lens according to claim 3, wherein curved directions of the second ends of adjacent two of the elastic arms are the same or opposite.

5. The zoom lens according to any one of claim 1, wherein a plurality of the elastic arms are disposed evenly on the bracket main body.

6. The zoom lens according to any one of claim 1, wherein the focusing ring is connected spirally to the lens barrel, the extension direction of the sliding slots along the lens barrel is the same as an extension direction of a thread on the focusing ring.

7. The zoom lens according to claim 6, wherein the sliding slots spirally extend on the lens barrel.

8. The zoom lens according to any one of claim 1, wherein during focusing, the lens piece bracket rotates with the focusing ring along a direction perpendicular to the plane in which the lens piece set is located, and the sliders slide in the sliding slots and the guide slots.

9. The zoom lens according to any one of claim 1, wherein the bracket main body are disposed with the lens barrel coaxially, and an outer wall of the bracket main body and an inner wall of the lens barrel are cylindrical surfaces.

10. The zoom lens according to claim 1, wherein the zoom lens further comprises a base, an optical element, and a circuit board, the lens barrel, the optical element, and the circuit board are disposed securely on the base, the optical element faces the lens piece set, and the circuit board is connected electrically to the optical element.

11. The zoom lens according to claim 10, wherein the optical element is one of a photosensitive element, a display screen, and an optical waveguide assembly.

12. The zoom lens according to claim 1, wherein the elastic arms and the lens piece bracket are formed integrally, and the sliders and the elastic arms are formed integrally.

13. An electrical device, comprising the zoom lens according to any one of claim 1.

* * * * *